United States Patent Office 3,546,196
Patented Dec. 8, 1970

3,546,196
PROCESS FOR THE PRODUCTION OF LINEAR POLYETHYLENES OF HIGH CRYSTALLINITY AND CATALYST THEREFOR
Antonio Vandi, Saronno, and Francesco Valeretto and Mario Ragazzini, Milan, Italy, assignors to Montecatini Edison S.p.A., Milan, Italy, a corporation of Italy
No Drawing. Filed Dec. 27, 1966, Ser. No. 604,574
Claims priority, application Italy, Jan. 3, 1966, 21/66
Int. Cl. C08f 1/72, 3/06
U.S. Cl. 260—94.9                                7 Claims

ABSTRACT OF THE DISCLOSURE

A process for producing linear polyethylene by polymerizing ethylene at a temperature between 0° C. and 250° C. (preferably 50° C. to 200° C.) and atmospheric pressure or superatmospheric pressure in the presence of a catalyst system consisting of a Lewis acid (preferably aluminum chloride, titanium tetrachloride and tin tetrachloride) in association with at least one halide of a metal from Group VIII, Period IV of the Werner Periodic Arrangement ofg the Elements (preferably cobalt dichloride, $CoCl_2$, or nickel dichloride, $NiCl_2$) the reaction being effected generally in the presence of a liquid medium in which the polyethylene is soluble but which is inert to the polymerization system and the catalyst. The molar ratio of Lewis acid (LA) to metal halide (MH), LA:MH=0.01 to 0.15 (preferably 0.05 to 0.1), the liquid medium being an aliphatic or cycloaliphatic hydrocarbon. The reaction is initiated by rupturing a vial containing the catalyst system in a reaction vessel (e.g. autoclave) containing ethylene and liquid medium at a superatmospheric pressure and a temperature between 50 C. and 200° C. The catalyst system is produced by precipitation of Lewis acid on the metal halide (e.g. by dissolving one or both components in a solvent and thereafter evaporating the solvent).

---

Our present invention relates to a process for the polymerization of ethylene in the presence of a catalyst system and to an improved catalyst system for carrying out such polymerization.

The desirability of polyethylene, and especially linear polyethylenes of high crystallinity and high molecular weight, is a factor which has long influenced the polymer field. Such polyethylenes are useful in the production of films, fibers and molded articles including blow-molded receptacles and even pressure-molded bodies of various shapes for high-impact packaging and housings.

Substantially all prior efforts to form high molecular weight polyethylenes with the aid of catalyst systems using Lewis acids have led to liquid polymers having low or high viscosity, depending upon the particular reaction conditions, although the use of certain reducing agents in Lewis-acid catalyst systems has been capable of improving the polymers to the extent that they may have a waxy consistency. It has not been possible, however, to our knowledge, to obtain with conventional Lewis acid catalysts of ethylene polymerization a product of such crystallinity that it is substantially solid or crystalline at room temperature or at the conclusion of the polymerization reaction.

It is, therefore, the principal object of the present invention to provide an improved system for the polymerization of ethylene which is capable of producing linear polymers of high molecular weight and high crystallinity.

A corollary object of our invention is to provide a catalyst system for the polymerization of ethylene which will yield solid polymers at the conclusion of the reaction, these polymers having a high degree of crystalline character.

Still another object of our invention is to provide polymeric materials having a high crystalline-polymer content and particularly suited for use in films, fibers and molded bodies wherever high quality polyethylenes of significant impact strength, good workability and high finishing qualities are desired.

A further object of our invention is to provide a catalyst system for the purposes described, of relatively low cost and formed from readily available and inexpensive materials.

These objects and others which will become apparent hereinafter are attained in accordance with the present invention, with a catalyst system which, surprisingly, has been found to give rise to linear polyethylenes whose crystalline-polymer content is unexpectedly high in spite of the fact that the catalyst system contains a Lewis acid of the type hitherto believed to be capable only of polymerizing ethylene to relatively amorphous polymers of low crystallinity.

According to our invention, linear polyethylene is produced by polymerizing monomeric ethylene at atmospheric or superatmospheric pressures and temperatures between 0° C. and 250° C. in the presence of a catalyst system in which at least one Lewis acid is associated with at least one halide (preferably a chloride) of a metal of Group VIII, Period IV of the Werner Periodic Arrangement of the Elements. It is found that, when such a catalyst is employed, the resulting polymer has excellent crystallinity and a high molecular weight, the process being substantially reproducible to yield polymers of consistently similar molecular weight and crystalline character provided the reaction conditions are generally similar.

The term "Lewis acid" as used herein is intended to define compounds, in accordance with the G. N. Lewis definition of acid and bases, i.e. substances capable of accepting from a base an unshared pair of electrons. For the purposes of the present invention, the Lewis acids found to be more advantageous are aluminum chloride ($AlCl_3$), titanium tetrachloride ($TiCl_4$) and tin tetrachloride ($SnCl_4$).

The Werner Periodic Arrangement of the Elements (see, for example, Handbook of Chemistry and Physics, 41st ed., Chemical Rubber Publishing Co., Cleveland, Ohio, 1959–1960; pp. 444–445) includes in Group VIII, Period IV, iron together with cobalt and nickel whose chlorides are effective for the purposes of the present invention in association with the Lewis acid. Best results are obtained, however, with cobalt dichloride ($CoCl_2$) and nickel dichloride ($NiCl_2$), both in the anhydrous state.

According to a further feature of this invention, the polymerization reaction is carried out by initially preparing the catalyst system, e.g. by precipiating the Lewis acid and the anhydrous metal halide upon evaporation of a solvent, thereafter introducing a potrion of the catalyst into a frangible vial, introducing this vial into a polymerization vessel (e.g. an autoclave), feeding ethylene into the autoclave until a substantial superatmospheric pressure develops therein (e.g. about a 100 atmospheres), and then rupturing the vial to release the catalyst system and promote the polymerization reaction at a temperature preferaby in the range of 50 to 200° C. The vial can be broken by agitation of the contents of the reaction vessel or by the superatmospheric pressure sustained therein.

The reaction time can, in accordance with our invention, vary within a fairly wide range, e.g. from several minutes up to 10 to 12 hours, although it has been found to be important to maintain the molar ratio of Lewis acid (LA) and metal halide (MH) between substantially La:MH=0.01 to LA:MH=0.15, although a preferable molar ratio is between substantially 0.05 and 0.1. It has been found that deviation from the later molar-ratio range to increase the Lewis-acid proportion is accomplished by an increase in the amount of the liquid or non-crystalline proportion of the polymer.

While the catalyst system can be formed essentially by mixing the Lewis acid with the cobalt or nickel dichloride, it has been found that the more intimate the association, the more reproducible and better are the polymerization products and a particularly intimate contact of the Lewis acid and the metal chloride is obtained when at least one of these components is precipitated in the presence of the other by sublimation or evaporation of a solvent. Thus the Lewis acid can be deposited upon the metal halide, previously dehydrated fully, by sublimation or evaporation of a solvent in which the Lewis acid is soluble but in which the cobalt chloride or the nickel chloride is substantially insoluble. Co- or joint precipitation is of course preferred. Furthermore, the reaction may be carried out in the absence of a solvent, although best results are obtained when the polymerization is effected in the presence of a solvent capable of solubilizing the polymer and thereby removing it from the catalyst surface to increase the effective concentration of ethylene at the active sites. This solvent, which should be inert to both the polymerization reaction and the catalys sysem, should be coninually stirred together with the remainder of the reaction medium. The best solvents have been found to be aliphatic and cycloaliphatic hydrocarbons.

While temperatures of 50° C. to 200° C. have been indicated to be preferable, it must be pointed out that a temperature above 120° C. has the advantage of insuring complete dissolution of the polymer as it is formed. Here again, an advantage lies in the fact that the polymer, upon its formation, cannot obstruct the reactive site of the catalyst. While any pressure from substantially one atmosphere to several hundred atmospheres has been found to be operative, we prefer a reaction pressure range between 50 and about 300 atmospheres.

It is found that the polyethylenes produced by the present method have densities (as determined by conventional ASTM Standards) in excess of 0.95, and structures as indicated by infrared tests which are substantially completely linear. The molecular weight of the polymers of the present invention ranges from 20,000 to 200,000, although in most cases it lies between 60,000 and 80,000; the molecular weight may be determined by viscosimetric tests according to Duck-Küchler Method, as described in Z. Elektrochemie, 60, 218, 1956. The polymers also have melting points between 128° C. and 137° C. as well as a crystalline-polymer content (in percent by weight) as determined by X-ray analysis of substantially 80%.

The invention is described in greater detail with reference to the following nonlimiting examples which illustrate the best mode presently known to us of carrying out the invention in practice:

EXAMPLE I 1 gram of anhydrous $AlCl_3$ was dissolved in about 100 cc. of ethyl chloride contained in a glass flask equipped with a stirrer. About 25 grams of $NiCl_2$, carefully dehydrated, were added during stirring. The ethyl chloride was, with continuous stirring, gradually evaporated from the flask in a nitrogen stream until a powder was formed. The powder was constituted of $NiCl_2$ on which $AlCl_3$ was deposited.

This powder was used in the following manner as a catalyst for the polymerization of ethylene: 7.0 grams of the powder was transferred into a glass capsule or vial which was sealed in a flame. This vial was then placed in a 0.5 liter autoclave, provided with a central stirrer, together with 250 cc. of n-heptane. Subsequently ethylene at a pressure of 250 atmospheres and at a temperature of 159° C. was fed over a period of three hours into said autoclave. At the end of the process, the contents of the autoclave were transferred into a glass beaker. Traces of solid polyethylene were recovered upon evaporation of the n-heptane. 15 grams of the solid polyethylene were obtained upon extraction with xylene of the solid residue. The product had the following properties.

Intrinsic viscosity ($\eta$) in decahydronaphthalene at 135° C.: 1.56
Melting point: 134° C.
Percent crystalline polymer content as ascertained by X-ray tests: 78%
Structure: linear.

EXAMPLE II 8.3 grams of a catalyst prepared as specified in Example I were used in an autoclave having capacity of 2 liters to polymerize ethylene in the persence of n-heptane. The polymerization was carried out at 100° C. under a pressure of 180–220 atmospheres for ½ hour. 15 grams of a solid crystalline polyethylene were obtained.

EXAMPLE III

A catalyst was prepared in the manner specified in Example I, with the sole difference that 2.5 grams of $AlCl_3$ were used for 25 grams of the $NiCl_2$. The powdered contained therefore about 10% by weight $AlCl_3$ with respect to the $NiCl_2$.

7.5 grams of this powder were used for polymerizing ethylene, at 157° C. and 260 atmospheres for 3 hours in the presence of n-heptane as a solvent for the polymer, in an autoclave having capacity of 2 liters. About 5 grams of an oily polymer, soluble in heptane, and 6.5 grams of solid crystalline polymer were obtained. This supports our finding that the ratio $AlCl_3/NiCl_2$ should be kept below 0.1 when no liquid ethylene polymer is desired as a co-product with solid polymer.

EXAMPLE IV 2.5 grams of anhydrous $AlCl_3$ were dissolved in about 150 cc. of ethyl chloride contained in a glass flask equipped with a stirrer. About 25 grams of $CoCl_2$, carefully dehydrated, were added under stirring to the solution. While continuing the stirring, the ethyl chloride was gradually evaporated in a nitrogen stream to yield a dry powder constituted of $CoCl_2$ on which $AlCl_3$ was deposited.

7.8 grams of this powder were used as a catalyst for polymerizing ethylene, at a temperature of 150° C. and under 150 atmospheres pressure, for 3 hours in a stainless steel autoclave having 0.5 liter capacity in the presence of 250 cc. of n-heptane. Several grams of liquid polymers, soluble in heptane, were obtained together in a solid polymer, insoluble in heptane, with the following characteristics.

Melting point: 127°–130° C.
A substantially linear structure as determined by infrared tests.

EXAMPLE V 1.0 gram of pure $TiCl_4$ was introduced into a vial containing 5 grams of nickel chloride, previously dehydrated by treatment with thionyl chloride. The vial was then sealed in a flame and placed together with 200 cc. of n-heptane in a stainless-steel autoclave having a capacity of 2 liters; the autoclave was equipped with a central stirrer. The autoclave was then heated to 160° C. and supplied with ethylene to a pressure of 150 atmospheres. The vial containing the catalyst was broken by the pressure. After 3 hours the autoclave was cooled and vented; 21 grams of high-molecular-weight solid polyethylene were obtained. This example supports our finding that, when $TiCl_4$ is used as the Lewis acid, the molar ratio of Lewis acid/$NiCl_2$ can be higher than the molar ratio allowed when using $AlCl_3$, without giving rise to liquid ethylene polymers.

EXAMPLE VI 5.5 grams of anhydrous $NiCl_2$ and 0.44 gram of $SnCl_4$ were introduced into a vial with the procedure specified in Example V. The catalyst mixture was used for polymerizing ethylene at 310 atmospheres pressure and 160° C. temperature for 3 hours. 1.5 grams of a solid ethylene polymer was obtained.

EXAMPLE VII

A vial containing 7.6 grams cobalt chloride (previously dehydrated by heating at 200° C. for 3 hours in a muffle furnace) and 0.76 gram of pure $TiCl_4$ was sealed in a flame and placed together with 300 cc. of n-heptane in a stainless-steel autoclave having a capacity of 1 liter; the autoclave was equipped with a central stirrer.

The autoclave was then heated to 160° C. and supplied with ethylene to a pressure 280 atmospheres. The vial containing the catalyst was shattered by the pressure. After 3 hours the autoclave was cooled and vented. Its contents were transferred to a glass beaker. 3 grams of polyethylene were obtained which, after having been submitted to extraction with boiling heptane left 3 grams of bottom residue.

EXAMPLE VIII

By operating as specified in Example VII, a vial containing 8.9 grams of anhydrous $CoCl_2$ and 0.89 gram of $SnCl_4$ was put into the autoclave. The mixture thus obtained was used to polymerize ethylene, at 160° C. and under 80 atmospheres pressure for 3 hours. 2 grams of a solid polymer soluble in boiling heptane were obtained.

EXAMPLE IX

A catalyst was prepared in a manner similar to that specified in Example I by using 15 grams of $TiCl_4$ and 100 grams of anhydrous $NiCl_2$. The powder thus obtained had therefore a content of about 15% $TiCl_4$ by weight in respect of $NiCl_2$. 5.65 grams of said powder were used for the polymerization of ethylene for 3 hours at 50° C. and under 250 atmospheres pressure, in the presence of n-heptane solvent and in an autoclave having a capacity of 1 liter. 3 grams of a solid polymer insoluble in boiling heptane were obtained.

EXAMPLE X

As specified in Example IX, a vial containing 5 grams of the catalyst was put into the autoclave. The polymerization of ethylene was carried out for 3 hours at 140° C. and under 40 atmospheres pressure, 2 grams of a solid polymer, insoluble in boiling heptane, were obtained.

EXAMPLE XI

A catalyst was prepared in a manner similar to that specified in Example V by using 5 grams of anhydrous nickel chloride, 1 gram of pure $TiCl_4$ and 200 cc. of anhydrous cyclohexane.

The mixture thus obtained was used for the polymerization of ethylene for 3 hours, at 160° C. and under 150 atmospheres pressure. 15 grams of a solid polyethylene of high molecular weight, insoluble in boiling heptane, was thus obtained. This example is evidence of our finding that polymerization can be carried out as well in the presence of cycloaliphatic solvents.

We claim:
1. A process for producing linear polyethylene comprising the steps of:
   polymerizing ethylene at a temperature ranging from substantially 0° C. to 250° C. at a pressure ranging from atmospheric pressure to about 300 atmospheres in the presence of a catalyst system consisting essentially of at least one Lewis acid selected from the group which consists of $AlCl_3$, $TiCl_4$ and $SnCl_4$ as a first component in association and in a molar ratio of substantially 0.01 and 0.15 with at least one halide of a metal selected from the group which consists of $NiCl_2$ and $CoCl_2$ as a second component, said ethylene being contacted with both said components jointly; and removing polyethylene from the system.
2. The process defined in claim 1 wherein said molar ratio of said Lewis acid and said halide ranges from 0.05 to 0.1.
3. The process defined in claim 1 wherein said temperature ranges between 50° C. and 200° C.
4. The process defined in claim 1 wherein the polymerization of ethylene is carried out in the presence of an organic liquid medium inert to the polymerization reaction and to said catalyst system but in which polyethylene is soluble.
5. The process defined in claim 4 wherein said organic liquid medium is selected from the group which consists of aliphatic and cyclo-aliphatic hydrocarbons.
6. A catalyst for producing linear polyethylene and constituted as a solid consisting exclusively of at least one Lewis acid selected from the group which consists of $AlCl_3$, $TiCl_4$ and $SnCl_4$ in association with at least one halide of a metal selected from the group which consists of $NiCl_2$ and $CoCl_2$ in a molar ratio of said Lewis acid to said halide of substantially 0.01 to 0.15.
7. A catalyst system as defined in claim 6 wherein said Lewis acid and said halide are present in a molar ratio between substantially 0.05 and 0.10.

References Cited

UNITED STATES PATENTS

| | | | |
|---|---|---|---|
| 2,387,784 | 10/1945 | Thomas et al. | 260—94.9 |
| 3,935,542 | 5/1960 | Minckler et al. | 260—94.9 |
| 2,962,451 | 11/1960 | Schreyer | 260—94.9 |
| 3,057,837 | 10/1962 | Calfee | 260—94.9 |
| 3,066,123 | 11/1962 | Strohmayer et al. | 260—93.1 |
| 3,067,183 | 12/1962 | Hagemeyer et al. | 260—88.2 |
| 3,067,189 | 12/1962 | Balas | 260—94.3 |
| 3,098,828 | 7/1963 | D'Alelio | 260—94.9 |
| 3,228,917 | 1/1966 | Childers | 260—94.9 |
| 3,230,209 | 1/1966 | Cesare | 260—94.9 |
| 3,236,826 | 2/1966 | Scott et al. | 260—94.3 |

JOSEPH L. SCHOFER, Primary Examiner

E. J. SMITH, Assistant Examiner

U.S. Cl. X.R.

252—441, 442; 260—683.15